United States Patent [19]
Hsu et al.

[11] Patent Number: 5,858,314
[45] Date of Patent: Jan. 12, 1999

[54] THERMALLY ENHANCED COMPACT REFORMER

[75] Inventors: Michael S. Hsu, Lincoln; Ethan D. Hoag, East Boston, both of Mass.

[73] Assignee: Ztek Corporation, Waltham, Mass.

[21] Appl. No.: 631,432

[22] Filed: Apr. 12, 1996

[51] Int. Cl.⁶ .................................................. B01J 12/00
[52] U.S. Cl. ...................... 422/211; 48/127.7; 48/127.9; 48/198.2; 48/198.8
[58] Field of Search .................................. 422/211, 222, 422/198; 48/127.9, 127.7, 198.2, 198.8

[56] References Cited

U.S. PATENT DOCUMENTS

| | | |
|---|---|---|
| 1,452,145 | 4/1923 | Cederberg . |
| 2,127,561 | 8/1938 | Herrmann ................................. 23/288 |
| 4,174,954 | 11/1979 | Küsebauch et al. ...................... 48/212 |
| 4,490,445 | 12/1984 | Hsu ........................................... 429/32 |
| 4,614,628 | 9/1986 | Hsu et al. .................................. 264/61 |
| 4,629,537 | 12/1986 | Hsu .......................................... 204/15 |
| 4,721,556 | 1/1988 | Hsu ....................................... 204/258 |
| 4,770,955 | 9/1988 | Ruhl ......................................... 429/33 |
| 4,789,561 | 12/1988 | Schäefer et al. ...................... 427/126.1 |
| 4,812,329 | 3/1989 | Isenberg ................................. 427/115 |
| 4,853,100 | 8/1989 | Hsu ......................................... 204/256 |
| 4,921,680 | 5/1990 | Bonk et al. ............................. 422/197 |
| 5,015,444 | 5/1991 | Koga et al. ............................. 422/195 |
| 5,021,304 | 6/1991 | Ruka et al. ............................... 429/30 |
| 5,039,510 | 8/1991 | Pinto ....................................... 423/652 |
| 5,073,405 | 12/1991 | Vasilow et al. ......................... 427/105 |
| 5,080,689 | 1/1992 | Pal et al. ................................ 29/623.5 |
| 5,085,742 | 2/1992 | Dollard et al. .......................... 205/188 |
| 5,180,561 | 1/1993 | Morishima et al. .................... 422/191 |
| 5,324,452 | 6/1994 | Allam et al. ............................ 252/373 |
| 5,338,622 | 8/1994 | Hsu et al. ................................. 429/26 |
| 5,346,779 | 9/1994 | Nakazawa ................................. 429/19 |
| 5,366,819 | 11/1994 | Hartvigsen et al. ...................... 429/17 |
| 5,397,656 | 3/1995 | Morimoto et al. ........................ 429/17 |
| 5,401,589 | 3/1995 | Palmer et al. ............................. 429/13 |
| 5,458,857 | 10/1995 | Collins et al. .......................... 422/198 |
| 5,462,817 | 10/1995 | Hsu .......................................... 429/19 |
| 5,470,670 | 11/1995 | Yasumoto et al. ........................ 429/20 |

FOREIGN PATENT DOCUMENTS

| | | |
|---|---|---|
| 0 330 751 | 9/1989 | European Pat. Off. . |
| 0 572 017 | 12/1993 | European Pat. Off. . |
| 62-167203 | 7/1987 | Japan . |
| 63-110557 | 5/1988 | Japan . |
| 02-120206 | 5/1990 | Japan . |
| 03-283266 | 12/1991 | Japan . |
| 2 057 908 | 4/1981 | United Kingdom . |
| 2 210 286 | 6/1989 | United Kingdom . |
| WO 92/16029 | 9/1992 | WIPO . |
| WO 95/26430 | 10/1995 | WIPO . |
| WO 96/05625 | 2/1996 | WIPO . |

*Primary Examiner*—Timothy McMahon
*Attorney, Agent, or Firm*—Thomas J. Engellenner; Anthony A. Laurentano; Lahive & Cockfield, LLP

[57] ABSTRACT

A natural gas reformer comprising a stack of thermally conducting plates interspersed with catalyst plates and provided with internal or external manifolds for reactants. The catalyst plate is in intimate thermal contact with the conducting plates so that its temperature closely tracks the temperature of the thermally conducting plate, which can be designed to attain a near isothermal state in-plane to the plate. One or more catalysts may be used, distributed along the flow direction, in-plane to the thermally conducting plate, in a variety of optional embodiments. The reformer may be operated as a steam reformer or as a partial oxidation reformer. When operated as a steam reformer, thermal energy for the (endothermic) steam reforming reaction is provided externally by radiation and/or conduction to the thermally conducting plates. This produces carbon monoxide, hydrogen, steam and carbon dioxide. When operated as a partial oxidation reformer, a fraction of the natural gas is oxidized assisted by the presence of a combustion catalyst and reforming catalyst. This produces carbon monoxide, hydrogen, steam and carbon dioxide. Because of the intimate thermal contact between the catalyst plate and the conducting plates, no excessive temperature can develop within the stack assembly. Details of the plate design may be varied to accommodate a variety of manifolding embodiments providing one or more inlets and exit ports for introducing, pre-heating and exhaust the reactants.

61 Claims, 4 Drawing Sheets

THERMALLY ENHANCED COMPACT REFORMER

BACKGROUND OF THE INVENTION

The present invention relates to reformers, and particularly to reforming apparatus that reforms fuel into fuel species suitable for use by electrochemical converters. In particular it relates to a plate type reformer suitable for either steam reforming or partial oxidation reforming.

The use of conventional hydrocarbon fuels as a fuel reactant for fuel cells is well known in the art. The hydrocarbon fuels are typically pre-processed and reformed into simpler reactants prior to introduction to the electrochemical converter. Conventionally, the fuel is pre-processed by passing the hydrocarbon fuel first through a desulfurization unit, then through a reformer, and a shift reactor (for $H_2$ fueled fuel cell only) to produce a suitable fuel stock.

Conventional steam reformers currently in wide commercial use comprise a reformer section consisting of a catalyst material which promotes the reforming reaction and a burner to supply heat for the endothermic reforming reaction. A steam source is typically connected to the reformer section to provide steam. The burner typically operates at temperatures well above that required by the reforming reaction and well above the operating temperatures of conventional fuel cells, e.g., solid oxide fuel cells. Because of this, the burner must be operated as a separate unit independent of the fuel cell and as such adds considerable bulk, weight, cost and complexity to the overall power system. Furthermore, the burner is not uniquely adaptable to utilize the waste heat generally available from the fuel cell. Moreover, the consumption of extra fuel by the burner limits the efficiency of the power system.

A typical tubular reformer contains multiple tubes, which are normally made of refractory metal alloys. Each tube contains a packed granular or pelletized material having a suitable reforming catalyst as a surface coating. The tube diameter typically varies from between 9 cm and 16 cm, and the heated length of the tube is normally between 6 and 12 meters. A combustion zone is provided external to the tubes, and is typically formed in the burner. The tube surface temperature is maintained by the burner in the range of 900° C. to ensure that the hydrocarbon fuel flowing inside the tube is properly catalyzed with steam at a temperature between 500° C. and 700° C. This traditional tube reformer relies upon conduction and convection heat transfer within the tube to distribute heat for reforming.

Plate-type reformers are known in the art, an example of which is shown and described in U.S. Pat. No. 5,015,444 of Koga et al. The reformer described therein has alternating flat gap spaces for fuel/steam mixture flow and fuel/air mixture flow. The combustion of the fuel/air stream within the spaces provides the heat for reforming of the fuel/steam mixture stream. A drawback of this design is that the reformer relies upon heat transfer between the adjacent flat gap spaces to promote the fuel reforming process.

U.S. Pat. No. 5,470,670 of Yasumoto et al. describes an integrated fuel cell/reformer structure, which has alternating layers of fuel cell and reformer plates. The heat transfer from the exothermic fuel cell to the endothermic reformer occurs through the thickness of the separating plates. A drawback of this design is that it is difficult to attain, if at all, temperature uniformities in this fuel cell/reformer structure, and which is essential in compact and efficient chemical or electrochemical apparatus designs. This fuel cell/reformer structure also requires complex and cumbersome reactant manifolding to interconnect the reactant flows between the alternating fuel cell layers and the reformer layers.

Electrochemical converters, such as fuel cells, have been known as systems for converting chemical energy derived from fuel stocks directly into electrical energy through electrochemical reaction. One type of fuel cell typically employed in fuel cell power generation systems is a solid oxide fuel cell. The solid oxide fuel cell generates electricity and releases waste heat at a temperature of about 1000° C.

A typical fuel cell consists mainly of a series of electrolyte units, onto which fuel and oxidizer electrodes are attached, and a similar series of interconnectors disposed between the electrolyte units to provide serial electrical connections. Electricity is generated between the electrodes across the electrolyte by an electrochemical reaction that is triggered when a fuel, e.g., hydrogen, is introduced at the fuel electrode and an oxidant, e.g., oxygen, is introduced at the oxidizer electrode.

Typically, the electrolyte is an ionic conductor having low ionic resistance thereby allowing the transport of an ionic species from one electrode-electrolyte interface to the opposite electrode-electrolyte interface under the operating conditions of the converter. The electrical current can be tapped for external load from the interconnector plates.

The conventional solid oxide fuel cell also includes, in addition to the features listed above, an electrolyte having a porous fuel and oxidizer electrode material applied on opposing sides of the electrolyte. The electrolyte is typically an oxygen ion conducting material, such as stabilized zirconia. The oxidizer electrode, which is typically maintained in an oxidizing atmosphere, is usually an perovskite of high electrical conductivity, such as strontium doped lanthanum manganite (LaMnO3(Sr). The fuel electrode is typically maintained in a fuel rich or reducing atmosphere and is usually a cermet such as zirconia-nickel (ZrO2/Ni). The interconnector plate of the solid oxide fuel cell typically is made of an electronically conducting material which is stable in both an oxidizing and reducing atmosphere.

There still exists a need in the art for apparatus that utilizes the waste heat generated by the fuel cell for reforming use. In particular, there exists a need for employing reformer design in close association with the electrochemical converters.

The invention will next be described in connection with certain preferred embodiments. However, it should be clear that various changes and modifications can be made by those skilled in the art without departing from the spirit and scope of the invention.

SUMMARY OF THE INVENTION

It is an object of the present invention to provide a plate-type reformer which has excellent thermal performance characteristics and allows effective thermal integration with a fuel cell. The invention further relates to a plate-type reformer which may be operated either as a steam reformer or as a partial oxidation reformer. When operating as a steam reformer it receives heat from a source such as a fuel cell, and receives steam from a source such as the exhaust of a fuel cell. The heat source can also be a combustion reactor. When operating as a partial oxidation reformer it combusts a relatively small portion, e.g., about 25%, of the incoming reactant gas to provide heat for the endothermic reforming reaction. The reformer is preferably capable of operating at an autothermal balanced condition which requires no other thermal input (heat source) nor steam supply. It is further capable of operating at a partial oxidation condition which is able to utilize the waste heat from a fuel cell.

Another object of the invention is to provide a plate-type reformer in which the catalyst is in intimate thermal contact with thermally conducting plates oriented, e.g., elongated, in the direction of the gas flow so that an average in-plane plate temperature is maintained to allow effective reforming reaction, as well as to eliminate or reduce the occurrence of hot spots which would be detrimental to the catalysts or structure materials of the reformer. The term "in-plane" is intended to mean the flat surfaces or side of the plate.

Still another object of the invention is to provide a plate-type reformer which is capable of utilizing the waste heat provided by the fuel cell for its endothermic reactions, either in steam reforming or in partial oxidation reforming.

Yet, another object of the invention is to provide a plate-type reformer which pre-heats the incoming reactants to a temperature suitable for reforming.

Another object of the invention is to provide a plate-type reformer in which multiple inlet manifolds are provided so that the reactants may be introduced to the reformer separately, and which are then thoroughly mixed within the reformer, before entering the oxidation section and the reformer section of the reformer.

The reformer of the present invention employs a thermal enhancement feature which promotes efficient fuel reformation. According to one aspect, the reformer includes a planar catalyst configuration having interleaved thermally conducting plates. The latter feature greatly enhances the thermal characteristics of the reformer, resulting in a relatively compact reformer design. Hence, the reformer can be thermally and physically integrated with an electrochemical converter for efficiently reforming hydrocarbon fuel and generating electricity.

The invention overcomes the size disadvantages of conventional reformers by utilizing the foregoing efficient heat transfer techniques to achieve temperature uniformity (isothermal surfaces) and energy balance in the system. This temperature uniformity reduces the amount of reforming material necessary to reform the incoming reactants. Furthermore, the thermal energy required by the endothermic reforming reactions is derived from the waste heat of the thermally integrated electrochemical converter. For example, under normal operating conditions the converter generates excess or waste heat, which is used to support an operating temperature consistent with that required for reforming (in the range between about 500° C. and about 700° C.).

Other general and more specific objects of the invention will in part be obvious and will in part be evident from the drawings and description which follow.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

Figure 1:
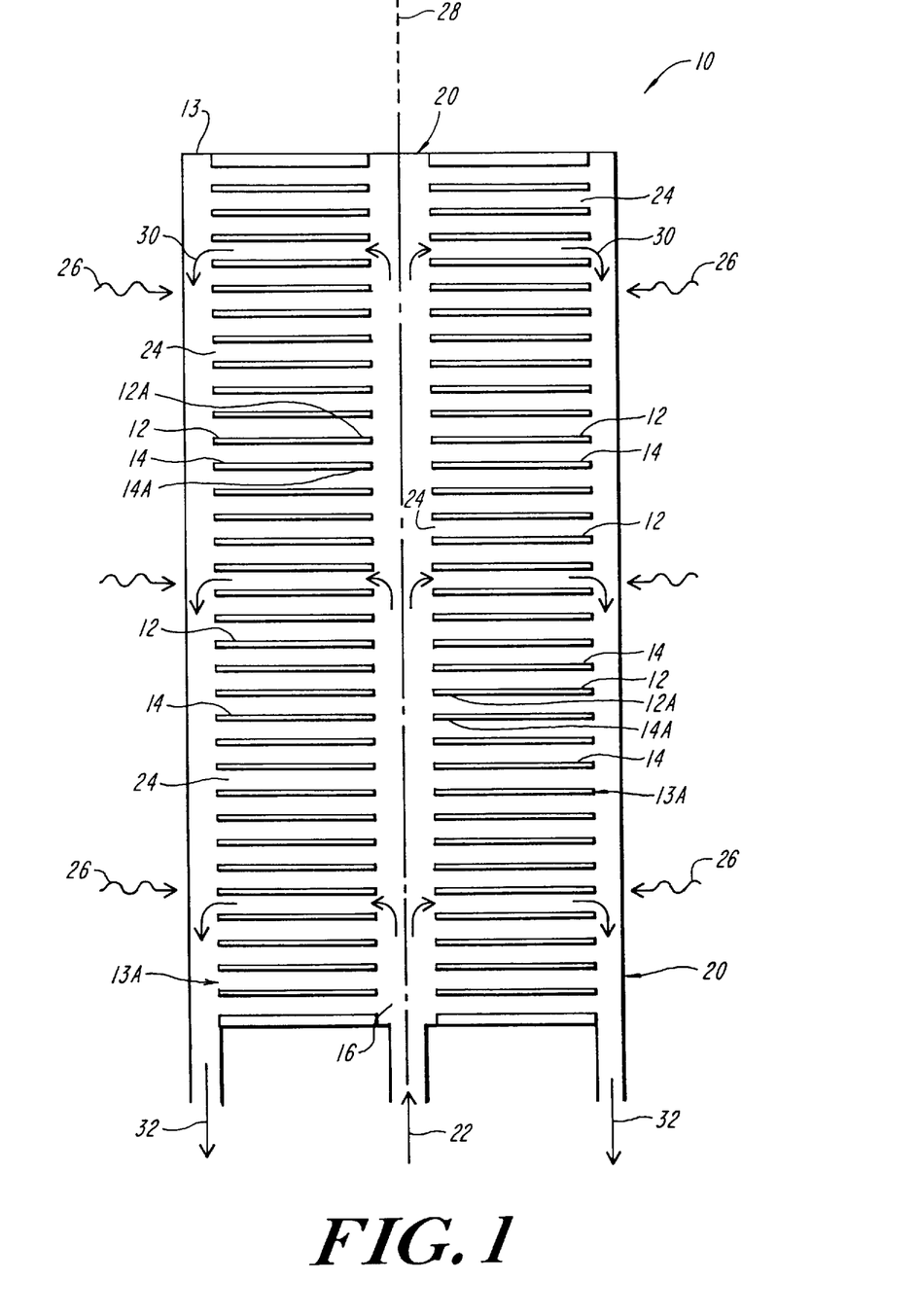
FIG. 1 is a cross-sectional view of one embodiment of an external fuel reformer according to the present invention.

FIG. 1 is a cross-sectional view of the reformer 10 of the present invention. The reformer 10 includes a number of thermally conductive plates 12 and reforming plates 14 that are alternately stacked together to form a stacked reforming structure 13 that extends along axis 28. The reformer includes a fluid conduit 16 that is in fluid communication with the inner portions 12A, 14A of the plates 12, 14. The reformer 10 is preferably housed within a gas-tight enclosure or housing 20. The illustrated reformer can be used to perform both steam and oxidation reforming. The heat necessary for the reforming process can be supplied internally by partial oxidation of hydrocarbon fuel or supplied externally by a remote heat source, as shown by wavy lines 26, to the reformer 10 by radiation, conduction or convection.

The reactant to be reformed by the reformer 10 is introduced into the apparatus through the axial fluid manifold 16. The reactant preferably comprises a mixture of a hydrocarbon fuel and a reforming agent, such as air, oxygen, water or $CO_2$, that are premixed either prior to introduction to the manifold 16 or within the reformer. The illustrated reformer 10 includes at least one manifold that delivers a fuel/reforming agent mixture to the reformer, rather than provide separate input manifolds for each gas constituent. The introduction of a premixed reactants to the reformer 10 provides for a relatively simple design.

The reactant mixture 22 is introduced to the manifold 16 by any appropriate means, such as by fluid conduits. The mixture 22 enters the inner portions of the reformer through reactant passages 24 that are formed between the adjacent conductive plates 12 and reforming plates 14. The passages can comprise any surface indentation or protrusions, which can be formed by embossing, and which constitutes a substantially continuous fluid passage that extends from the manifold 16 to the outer peripheral surface 13A of the stacked reforming structure 13. The passages can also be formed by utilizing conductive or reforming plates that are made of a porous material or have a power reformer catalyst material coated or formed thereon, thus allowing the reactant to pass through the reformer.

Figure 2A:
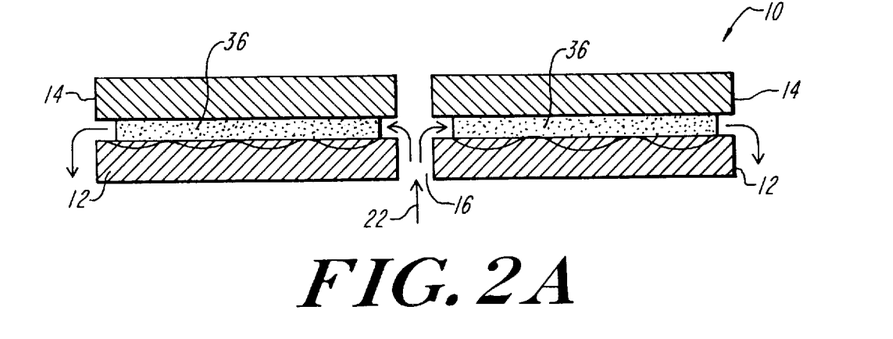
FIGS. 2A–2C are cross-sectional views of various embodiments of the catalyst and reforming plates of FIG. 1.
Figure 2B:
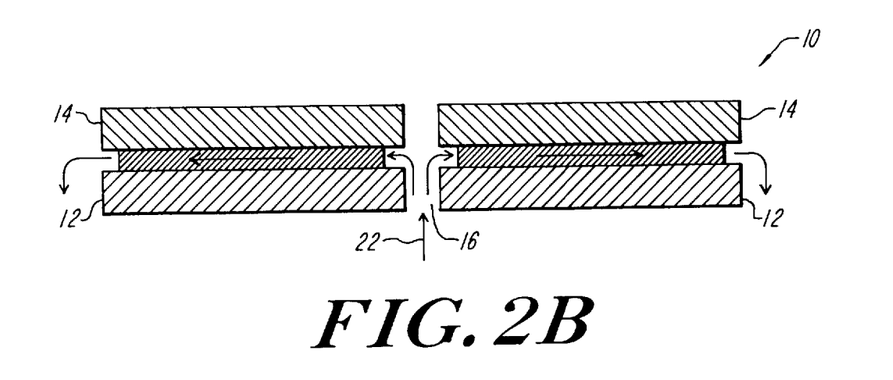
Figure 2C:
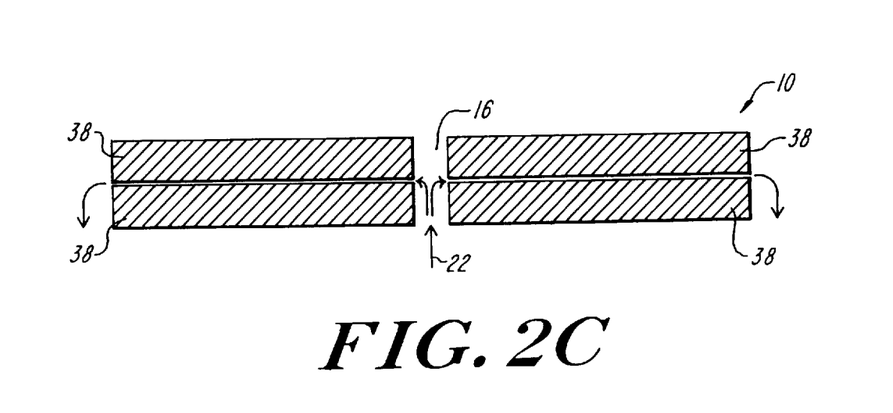

Examples of these various plate arrangements and configurations are illustrated in FIGS. 2A–2C. FIG. 2A illustrates the stacked arrangement of the reformer plates 14 and conductive plates 12. The reformer plates preferably have formed thereon a reformer catalyst material 36 that intimately contacts the conductive plate 12. The illustrated conductive plate 12 is embossed to form reactant flow channels. The mixture 22 is introduced to the axial manifold 16 and enters the reactant channels, where it exits the stacked plate reformer at the peripheral edges thereof.

The reformer catalyst material can be composed of a solid or porous material. FIG. 2B illustrates the mixture flow through the reformer 10 when using a porous reforming material. The use of a porous reforming material relaxes the embossing requirements of the illustrated reformer.

In another embodiment, as illustrated in FIG. 2C, the reformer 10 includes a plurality of stacked plates 38 or simply a columnal structure that are formed of a composite of thermally conductive material and a reforming material. This composite plate 38 can be achieved by interspersing a suitably thermally conductive material in admixture with a suitable reforming material. The resultant stacked structure operates substantially identical to the stacked reforming structure 13 shown in FIGS. 1, 2A and 2B and described above.

Those of ordinary skill will recognize that other embodiments of the reformer 10 exists, such as where the reforming plates 14 are composed of a porous material and have a reforming catalyst material disposed therein or coated thereon. The use of porous materials is one of the advantages of the present external reformer since it relaxes the gas-tight requirements of the reforming system without sacrificing efficiency.

The reactant mixture is reformed within the stacked reforming structure 10 as the reactant passes through the reactant passages and over or through the reforming plates 14. The catalyst material associated with the reforming plates 14 promotes the reforming of the hydrocarbon fuel into simpler reaction species. The stream of reactant mixture introduced to the manifold 16 can comprise $H_2O$, $O_2$, and $CO_2$, in addition to a hydrocarbon fuel. For example, methane ($CH_4$) can be catalytically reformed into a mixture of hydrogen, water, carbon monoxide and carbon dioxide.

When operating the reformer as a steam reformer, it receives a reactant gas mixture containing natural gas (or methane) and steam. Steam reforming catalyst can be formed on the reformer plate 14 in a circumferential band. Thermal energy for the reforming reaction is preferably conducted radially inward from the gas-tight enclosure by the conductive plates 12. The thickness and thermal conductivity of the conductive plates are selected to provide sufficient heat flow radially (or in-plane) to provide heat for the endothermic reforming reaction. The conductive plate can include an integral extension which protrudes into the axial reactant manifold 16 for preheating the incoming reactants, as described in further detail below.

When operating the reformer as a partial oxidation reformer, it receives a reactant gas mixture containing natural gas (or methane) and air or oxygen. One or more types of reforming catalyst material can be distributed in circumferential bands on the reformer plate. According to one aspect, the plate can include an inner band which contains a combustion catalyst 92, and a radially outer band 90 which contains catalyst to promote reforming of methane by water vapor (steam reforming) and by carbon dioxide. Thermal energy for these endothermic reforming reactions is conducted radially from the combustion band to the reforming band by the plate 12. Catalysts for other reactions, such as conventional shift reactions that convert CO in the presence of $H_2O$ to form $H_2$ and $CO_2$ may also be incorporated. The thickness and thermal conductivity of the conductive plates 12 are selected to provide sufficient heat flow radially between the inner combustion band and the outer reforming band to supply heat energy for the endothermic reforming reactions. The conductive plates 12 also provide sufficient heat flow radially from the combustion band to pre-heat the incoming reactants at the inlet passages 24 to near operational temperatures, e.g., at least about 300° C. The thermal energy of the system is preferably transferred from the external source to the reformer 10 through the gas-tight enclosure 20.

The illustrated reformer 10 can be used to reform reactants such as alkanes (paraffin hydrocarbons), hydrocarbons bonded with alcohols (hydroxyls), hydrocarbons bonded with carboxyls, hydrocarbons bonded with carbonyls, hydrocarbons bonded with alkenes (olifins hydrocarbons), hydrocarbons bonded with ethers, hydrocarbons bonded with esterhydrocarbons bonded with amines, hydrocarbons bonded with aromatic derivatives, and hydrocarbons bonded other organo-derivatives.

The band of reforming material of the reformer 10 can be located and mixed in varying proportions to maximize the production of reformed gas.

The reforming plate 14 can be composed of any suitable reforming catalytic material that operates at temperatures in the range between about 200° C. and about 800° C. Examples of the types of material that can be used include platinum, palladium, chromium, chromium oxide, nickel, nickel oxide, nickel containing compounds, and other suitable transition metals and their oxides. The reforming plate 14 can further include a ceramic support plate that has a reforming material coated thereon, as illustrated in FIGS. 2A and 2B. Thus, the reforming plate 14 of the present invention can include any multi-stacked reforming plate structure that includes suitable reforming catalysts that promote the reformation of a hydrocarbon fuel into suitable reaction species.

The conductive plate 12 can be formed of any suitable thermally conductive material, including metals such as aluminum, copper, iron, steel alloys, nickel, nickel alloys, chromium, chromium alloys, platinum, and nonmetals such as silicon carbide, and other composite materials. The thickness of the conductive plate 12 can be selected to maintain a minimum temperature gradient in-plane of the plate 12 and to thereby provide an isothermal region for optimum reforming reaction and to alleviate thermal stress in the reforming plates 14. The conductive plate 12 preferably forms a near isothermal condition in-plane of each plate 12. The isothermal surface formed by the conductive plate 12 improves the efficiency of the overall reforming process by providing a substantially uniform temperature and supply of heat over the surface of the plate for reforming.

Furthermore, the conductive plates form an isothermal condition along the axis of the stack (along the outer peripheral surface of the stacked reformer 13) by the uniform distribution of the reactant mixture through the reactant passages, thereby preventing cold or hot spots from developing along the stack. This improves the thermal characteristics of the reformer 10 and improves the overall performance of the system. As used herein, the term "isothermal" condition or region is intended to include a substantially constant temperature that varies only slightly in an axial or in-plane direction. A temperature variation of at least about 50° C. is contemplated by the teachings of the present invention.

The reformed fuel or reaction species is exhausted along the peripheral portion 13A of the stacked reforming structure 13, as indicated by wavy lines 30. The peripheral exhausting of the reaction species, e.g., reformed fuel products allows relatively easy manifolding of the reactants. The exhausted fluid media are then collected by the gas-tight housing 20 and exhausted therefrom through exit conduits 32. The gas-tight housing 20 thus serves as a peripheral manifold.

In an alternate embodiment, the reactant mixture 22 can be introduced into the peripheral manifold formed by the housing 20 and then into the stacked reforming structure 13 along the peripheral edge. The reactant flows radially inward across the reforming and conductive plates 14, 12 and is discharged through the axial manifold 16.

The ability to vent the reformed reactant mixture at least at a substantial portion of the periphery of the stack, and preferably from nearly the entire periphery, provides for an exposed peripheral surface devoid of a gas-tight seal or insulating material. Hence, the external reformer 10 of the present invention achieves a compact, simple, elegant external reforming design.

The gas-tight enclosure 20 is preferably composed of a thermally conductive material, such as metal. In the illustrated embodiment, the gas-tight enclosure 20 radiantly receives heat energy from an external heat source and further radiantly transfers this heat energy to the stack 13 and thus to the conductive plates 12. The plates 12 supply the heat energy necessary for the reforming reaction by conductively transferring the heat from the outer peripheral surface 13A of the stack 13 inwardly towards the reactant manifold 16.

In another embodiment, the outer surface of the reforming structure 10 contacts the inner surface of the gas-tight housing, which serves to conductively transfer the heat energy to the conductive plates.

The gas-tight enclosure of cylindrical configuration is particularly suitable for pressurized reformer operation. The pressure within the vessel is preferably between about ambient and about 50 atm.

The technique for achieving axial reactant flow distribution uniformity is as follows. The reactant flow passages 24 are designed to ensure that the total reactant flow pressure drop in the reactant passages is significantly greater than or dominates the reactant flow pressure drop in the reactant manifold 16. More specifically, the flow resistance of the passages 24 is substantially greater than the flow resistance of the axial manifold 16. According to a preferred practice, the reactant flow pressure within the passages 24 is about ten times greater than the reactant flow pressure within the manifold. This pressure differential ensures an axial and azimuthal uniform distribution of reactant along the reactant manifold 16 and the reactant passages 24 and essentially from top to bottom of the reformer stack 13. The uniform flow distribution ensures a uniform temperature condition along the axis of the reforming structure 10.

According to a preferred embodiment, the stacked reforming structure 13 is a columnal structure, and the plates have a diameter between about 1 inch and about 20 inches, and has a thickness between about 0.002 inch and about 0.2 inch. The term columnal as used herein is intended to describe various geometric structures that we stacked along a longitudinal axis and have at least one internal reactant manifold which serves as a conduit for a reactant mixture.

Those of ordinary skill will appreciate that other geometric configurations can be used, such as rectangular or rectilinear shapes with internal or external manifolds. The plates having a rectangular configuration can be stacked and integrated with attached external manifolds for the supply and the collection of the reactant and reforming resultant species.

The relatively small dimensions of the plates 12, 14 of the reformer 10 provide for a compact plate-type reformer that reforms a hydrocarbon fuel into suitable reaction species, and which is easily integratable with existing power systems and assemblies. The illustrated reformer 10 can be thermally integrated with an electrochemical converter, such as a solid oxide fuel cell. In the special application where the reformed fuel is introduced into the fuel cell, the required heat of reaction is supplied from the waste heat generated by the fuel cell.

According to another practice of the present invention, the reformer structure of FIG. 1 can also function as a plate-type burner. Specifically, hydrocarbon fuel can be oxidized in the presence of air or other oxidants with or without a suitable catalyst material. The burner embodiment of the present invention includes a conductive plate 12 and a catalyst plate 14 that are alternately stacked together, as described above in relation to the reformer of FIG. 1. The burner can employ an input manifold 16 to introduce the incoming reactant to the burner. The incoming reactants can comprise a hydrocarbon fuel and an oxidant, such as air. The hydrocarbon fuel and oxidant can be separately manifolded to the burner or can be premixed. For example, if substantially gas-tight materials are used to form the plates 12, 14, the reactants are premixed either prior to introduction to the burner or within the input manifold. Conversely, if either plate is formed of a porous material, the reactants can be separately manifolded. The reactants passing across the porous material of the plate then pass therethrough and mix with the other reactant within the reactant passages. The combusted or oxidized reactant is then discharged about the periphery of the burner stack. The oxidized reactant or the resultant species includes $CO_2$, $H_2O$ and other stable combustion products depending upon the type of fuel.

The conductive plate of the burner is identical to that of the reformer and functions to conductively transfer heat in-plane of the plate to form an isothermal surface. The thickness of the conductive plate is designed to maintain a minimum temperature gradient in-plane of the plate to provide an isothermal region for optimum combustion reaction to produce reduced NOx, if air is used as the oxidant, and to alleviate thermal stress in the catalyst plates 14.

Furthermore, the isothermal condition can be maintained by the uniform distribution of reactants of along the axis of the stack, thus preventing cold hot spots from developing along the stack. This improves the overall thermal characteristics of the burner and improves the overall operating performance of the burner.

The illustrated burner further includes reactant flow passages 24, as set forth above in conjunction with the reformer 10. The reactant passages 24 are designed to ensure that the total reactant flow pressure drop in the reactant passages 24 is significantly greater than the reactant flow pressure drop in the reactant manifold 16. More specifically, the flow resistance the passages 24 is substantially greater than the flow resistance in the axial manifold 16. This pressure differential ensures an axial and azimuthal uniform distribution of reactant throughout the axial length of the burner.

The oxidized reactant can be discharged about the peripheral portion of the burner. The exhausted fluid mediums can be captured by a gas-tight housing 20 that surrounds the burner.

In an alternate embodiment, the burner can include a plurality of stacked plates that are formed of a composite of a thermally conductive material and a catalyst material. This composite plate can be achieved by interspersing a suitably thermally conductive material in admixture with a suitable catalytic material. The resulting stacked structure operates substantially identical to the stacked reforming structure 13 shown in FIG. 1 and described above.

In an alternate embodiment, the burner can include a cylindrical column that is formed of a composite of a thermally conductive material and a catalyst material by interspersing a suitably thermally conductive material in admixture with a suitable catalytic material. The resulting reforming structure operates substantially identical to the stacked reforming structure 13 shown in FIG. 1 and described above.

All other features discussed above in relation to the reformer are equally applicable to the burner.

Figure 3:
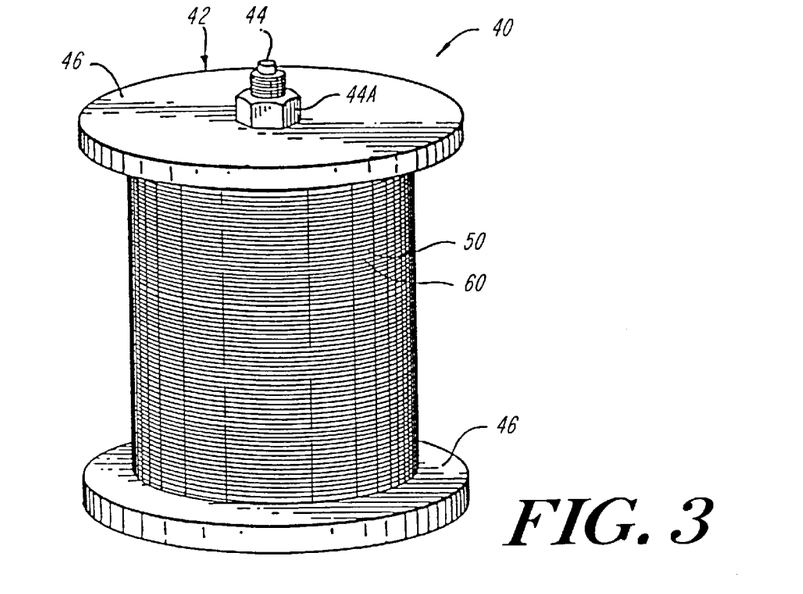
FIG. 3 is an isometric view of an assembled electrochemical converter with internal reforming capability.

FIG. 3 shows an isometric view of a reformer incorporated internal to an electrochemical converter according to a preferred embodiment of the invention. The internal reforming electrochemical converter 40 is shown consisting of alternating layers of an electrolyte plate 50 and an interconnector plate 60. The interconnector plate is typically a good thermal and electrical conductor. Holes or manifolds formed in the structure provide conduits for the fuel and oxidizer gases, e.g., input reactants. Reactant flow passageways formed in the interconnector plates, FIG. 4, facilitate the distribution and collection of these gases.

Figure 4:
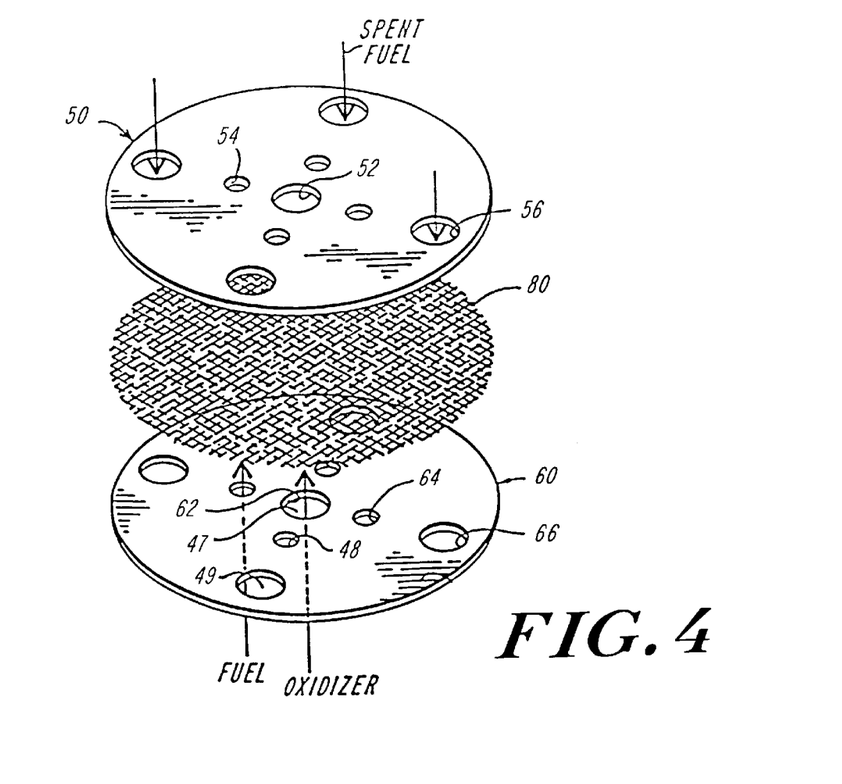
FIG. 4 is a more detailed isometric view of the electrolyte component and the interconnector component of an electrochemical converter allowing internal reforming.

The plates 50, 60 of the internal reforming electrochemical converter 40 are held in compression by a spring loaded tie-rod assembly 42. The tie-rod assembly 42 includes a tie-rod member 44 seated within a central oxidizer manifold 47, as shown in FIG. 4, that includes an assembly nut 44A. A pair of endplates 46 mounted at either end of the internal reforming electrochemical converter 40 provides uniform clamping action on stack of alternating interconnector and electrolyte plates 50, 60 and maintains the electrical contact between the plates and provides gas sealing at appropriate places within the assembly.

Figure 5:
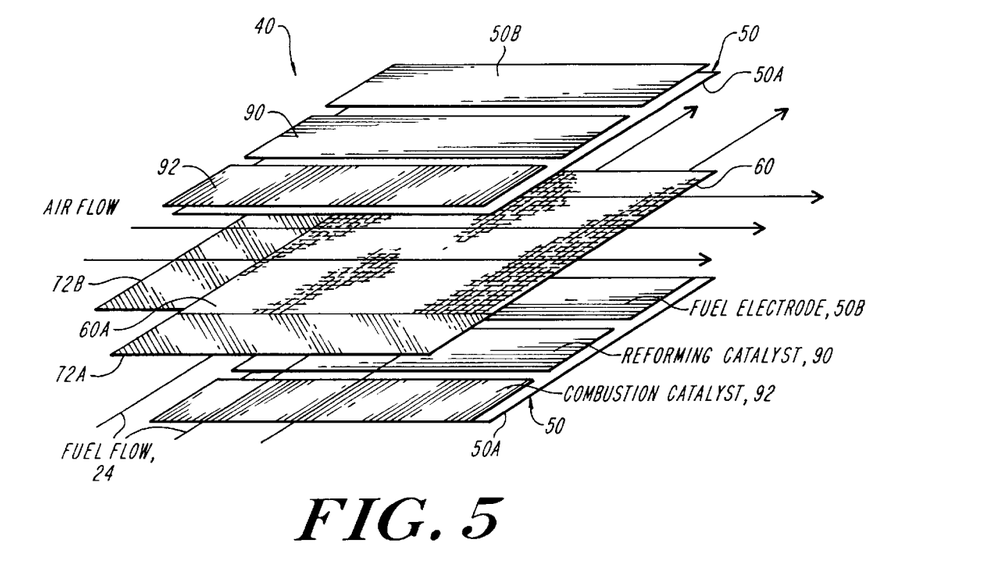
FIG. 5 is a cross-sectional assembled view of the electrolyte component and interconnector component according to the invention illustrating the flow of reactants therethrough of external manifolding.

FIGS. 3 through 5 illustrate the basic cell unit of the electrochemical converter 40, which includes the electrolyte plate 50 and the interconnector plate 60. In one embodiment, the electrolyte plate 50 can be made of a ceramic material, such as a stabilized zirconia material $ZrO_2(Y_2O_3)$, an oxygen ion conductor, and a porous oxidizer electrode material 50A and a porous fuel electrode material 50B which are disposed thereon. Exemplary materials for the oxidizer electrode material are perovskite materials, such as $LaMnO_3$ (Sr). Exemplary materials for the fuel electrode material are cermets such as $ZrO_2/Ni$ and $ZrO_2/NiO$.

The interconnector plate 60 preferably is made of an electrically and thermally conductive interconnect material. The materials suitable for interconnector fabrication include metals such as aluminum, copper, iron, steel alloys, nickel, nickel alloys, chromium, chromium alloys, platinum, platinum alloys, and nonmetals such as silicon carbide, $La(Mn)CrO_3$, and other electrically conductive materials. The interconnector plate 60 serves as the electric connector between adjacent electrolyte plates and as a partition between the fuel and oxidizer reactants. Additionally, the interconnector plate 60 conductively transfers heat in-plane (e.g., across the surface) of the plate to form an isothermal surface, as described in further detail below. As best shown in FIG. 4, the interconnector plate 60 has a central aperture 62 and a set of intermediate, concentric radially outwardly spaced apertures 64. A third outer set of apertures 66 are disposed along the outer cylindrical portion or periphery of the plate 60.

The interconnector plate 60 can have a textured surface. The textured surface 60A preferably has formed thereon a series of dimples, which are formed by known embossing techniques and which form a series of connecting reactant flow passageways. Preferably, both sides of the interconnector plate have the dimpled surface formed thereon. Although the intermediate and outer set of apertures 64 and 66, respectively, are shown with a selected number of apertures, those of ordinary skill will recognize that any number of apertures or distribution patterns can be employed, depending upon the system and reactant flow and manifolding requirements.

Likewise, the electrolyte plate 50 has a central aperture 52, and a set of intermediate and outer apertures 54 and 56 that are formed at locations complementary to the apertures 62, 64 and 66, respectively, of the interconnector plate 60.

As shown in FIG. 4, a reactant flow adjustment element 80 can be interposed between the electrolyte plate 50 and the interconnector plate 60. The flow adjustment element 80 serves as a fluid-flow impedance between the plates 50, 60, which restricts the flow of the reactants in the reactant flow passageways. Thus, the flow adjustment element 80 provides for greater uniformity of flow. A preferred flow adjustment element is a wire mesh or screen, but any suitable design can be used provided it serves to restrict the flow of the reactants at a selected and determinable rate.

Referring to FIG. 4, the electrolyte plates 50 and the interconnector plates 60 are alternately stacked and aligned along their respective apertures. The apertures form axial (with respect to the stack) manifolds that feed the cell unit with the input reactants, and that exhaust spent fuel. In particular, the central apertures 52, 62 form input oxidizer manifold 47, the concentric apertures 54, 64 form input fuel manifold 48, and the aligned outer apertures 56, 66 form spent fuel manifold 49.

The absence of a ridge or other raised structure at portion of the periphery of the interconnector plate provides for exhaust ports that communicate with the external environment. The reactant flow passageways connect, fluidwise, the input reactant manifolds 47 and 48 with the outer periphery of the reformer 40, thus allowing the reactants to be exhausted externally of the converter.

The internal reforming electrochemical converter is a stacked plate assembly of cylindrical configuration, and at least one of the electrolyte plate and the conductive plate has a diameter between about 1 inches and about 20 inches, and has a thickness between about 0.002 inches and about 0.2 inches.

The internal reforming electrochemical converter 40 of this invention has incorporated therein additional features as described below. The internal reforming operation when performed in the presence of steam receives a reactant gas mixture containing natural gas (or methane) and steam. A steam reforming catalyst 90, (FIG. 5) is distributed in a circumferential band that precedes the fuel electrode material 50B on the electrolyte plate 50. Thermal energy for the reforming reaction is conducted radially by the plate 60 to the reforming band. The thickness and thermal conductivity of the plates is designed to provide sufficient heat flow radially between the inner reforming band 90 and the outer fuel cell band (e.g., band 50B) to provide heat energy for the endothermic reforming reaction and to pre-heat the incoming reactants.

The internal reforming can also be performed by a partial oxidation reaction. In this mode, the illustrated converter 40 receives a reactant gas mixture containing natural gas (or methane) and air or oxygen. One or more types of catalyst are distributed in circumferential bands preceding the fuel electrode 50B on the electrolyte plate 50. As shown in FIG. 5, the electrolyte plate includes an inner band that contains a combustion catalyst 92, a radially outer band 90 that contains catalysts to promote reforming of methane by water vapor (steam reforming) and by carbon dioxide. Thermal energy for these endothermic reforming reactions is conducted radially from the combustion band 92 to the reforming band 90. Catalysts for other reactions, e.g. shift reactions etc. may also be incorporated. The thickness and thermal conductivity of the conductive plates is designed to provide sufficient heat flow radially between the inner combustion band 90 and the radially outer reforming band 90 to provide the endothermic reaction energy and to pre-heat the incoming reactants. Additional thermal energy can be obtained from the exothermal fuel cell reaction performed by the fuel electrode 50B illustrated as an outermost band along the diameter of the plate.

In the illustrated electrochemical converter 40, the combustion catalyst 92, the reforming catalyst 90 and a shift catalyst (which can be also applied as a band radially outward of the reforming catalyst 80) can also be applied on the flow adjustment element, which is situated between the electrolyte plate and the conductive plate.

The reformer may apply the catalysts which are mixed in varying proportions radially to maximize the production of product gas.

All of the reforming features discussed above in relation to the external reformer and band are equally applicable to this internal reforming electrochemical converter. For example, the interconnector plate 60 can include extended lip portions 72A and 72B, either of which can be used to preheat incoming reactants.

The internal reforming electrochemical converter 40 of the present invention can be a fuel cell, such as a solid oxide fuel cell, molten carbonate fuel cell, alkaline fuel cell, phosphoric acid fuel cell, and proton membrane fuel cell. The preferred fuel cell of the present invention is a solid oxide fuel cell. The internal reforming electrochemical converter 40 of the present invention preferable has an operating temperature above 600° C., and preferably between about 900° C. and 1100° C., and most preferably about 1000° C.

Those of ordinary skill will appreciate that the illustrated combustion, reforming and fuel electrode bands are merely representative of relative locations of electrochemical operations that occur during use of the converter 40 as a reformer.

In another embodiment of the invention, the internal reforming electrochemical converter 40 can have any desirable geometric configuration, such as a rectilinear configuration. The stacked structure can thus include rectangular electrolyte plates 50 and rectangular interconnector plates 60 with manifolds attached external to the plates. The catalytic and electrode materials can be applied in strips on the electrolyte plates perpendicular to the reactants flow direction. As illustrated in FIG. 5, the fuel flow 24 is perpendicular to the elongated bands 92, 90 and 50B. The interconnector plates 60 conductively transfer heat energy to the endothermic reforming catalyst band 90, the exothermic combustion catalyst band 92, and the exothermic fuel cell band 50B, resulting in a substantially in-plane isothermal condition, as illustrated in FIG. 6.

Figure 6:
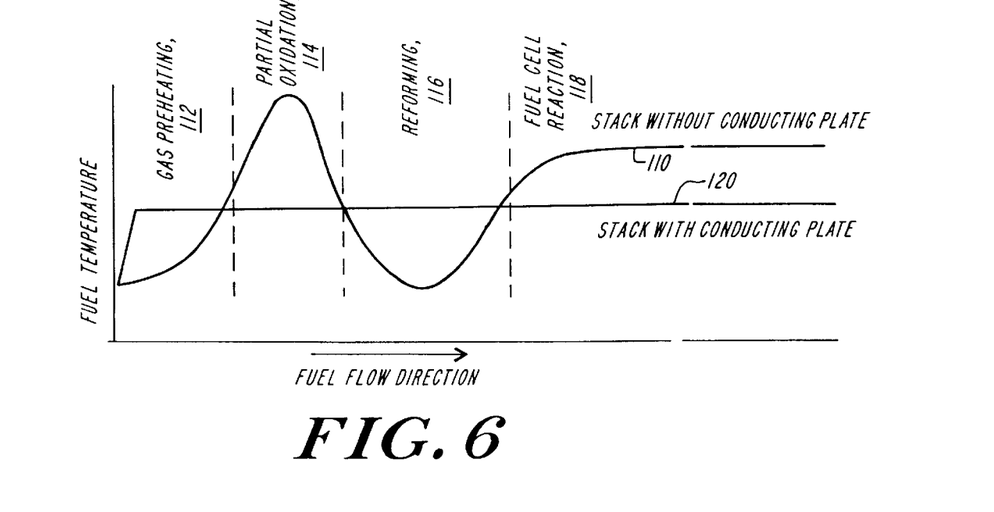
FIG. 6 graphically illustrates that the interconnector plates provide the heat transfer function among the endothermic reforming strip and the exothermic combustion strip and the exothermic fuel cell strip, resulting in an isothermal in-plane temperature.

FIG. 6 graphically depicts the isothermal temperature condition of the incoming reactants, e.g., hydrocarbon fuel, and reformed fuel established by the thermally conductive plate 60 during its passages over the electrolyte plate 50. The temperature of the fuel during operation is defined by the ordinate axis and the fuel flow direction is defined by the abscissa. In a reforming structure that does not utilize a thermally conductive plate to transfer heat in-plane during operation, the fuel temperature varies greatly in the direction of fuel flow, as denoted by waveform 110. As illustrated, the incoming fuel is initially preheated, as by the extended surfaces 72A and 72B. This preheating stage 112 corresponds to a rise in the fuel temperature as it approaches the operating temperature of the converter 40. During the exothermic partial oxidation or combustion stage 114, the temperature of the fuel further increases until the fuel flow reaches the reformation stage 116. The endothermic reformation stage requires a significant amount of heat energy to sustain the reforming operation. The fuel than flows to the fuel cell reaction stage 118, where the fuel is again heated, e.g., by the relatively hot operating environment of the converter 40. This sinusoidal like temperature profile 110 of the fuel decreases the overall operating efficiency of the converter, as well as exposes certain components (the electrolyte plate 50) to undesirable thermal stresses. The introduction of the conductive (interconnector) plate within the converter 40 "smoothes" the temperature profile and creates a substantially isothermal temperature condition, in-plane and axially along the converter stack, through all stages of operation as illustrated by the isothermal profile 120.

According to one mode of operation, the internal reforming electrochemical converter catalytically reforms the hydrocarbon fuel with $H_2O$ to produce $H_2$ and CO, which in turn proceeds to the fuel cell portion (e.g., fuel electrode 50B) for electricity generation. It produces exhaust species $H_2O$ and $CO_2$. The heat from the exothermic fuel cell reaction is conductively transferred in-plane to the conducting plates to support the endothermic reforming reaction.

According to another mode of operation, the internal reforming electrochemical converter catalytically oxidizes hydrocarbon fuel to produce $H_2$ and CO, which proceeds to the fuel cell section for electricity generation. It produces exhaust species $H_2O$ and $CO_2$. The heat from the exothermic fuel cell reaction is conductively transferred in-plane to the conductive plates 60 to support the mildly exothermic partial oxidation reforming reaction.

The internal reforming electrochemical converter can be placed in an enclosure designed for pressurized operation.

Another significant feature of the present invention is that the extended heating surfaces 72D and 72C heat the reactants delivered from the oxidizer and fuel external manifolds 47 and 48 to the operating temperature of the converter. Specifically, the extended surface 72D that protrudes into the oxidizer manifold 47 heats the oxidizer reactant, and the extended surface 72C that protrudes into the fuel manifold 48 heats the fuel reactant. The highly thermally conductive interconnector plate 60 facilitates heating of the input reactants by conductively transferring heat from the fuel cell strip to the extended surfaces or lip portions, thus heating the input reactants to the operating temperature. The extended surfaces thus function as a heat fin. This reactant heating structure provides a compact converter that is capable of being thermally integrated into a power system to realize extraordinary system efficiency.

The illustrated electrochemical converter 40 of FIGS. 3–5 is also capable of performing chemical transformation and production, while concomitantly producing electricity in a coproduction operation.

According to this embodiment, the electrochemical converter 40 is adapted to receive electricity from a power source, which initiates an electrochemical reaction within the converter and reduces selected pollutants contained within the incoming reactant into benign species. Hence, for example, the electrochemical converter 40 can be coupled to an exhaust source that contains selected pollutants, including NOx and hydrocarbon species. The converter 40 catalytically reduces the pollutants into benign species, including $N_2$, $O_2$ and $CO_2$.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed is:

1. A plate-type reformer for reforming a reactant into reaction species during operation, said reformer comprising:
    a plurality of catalyst plates having associated therewith one or more catalyst materials for promoting reformation and a plurality of conductive plates formed of a thermally conducting material, said catalyst plates and said conductive plates being alternately stacked to form a reforming structure, the conductive plates conductively transferring heat energy in-plane, across a surface of the conductive plate, to support the reforming process.

2. The reformer of claim 1 wherein said reforming process includes one or more reforming reactions, said reforming reactions including a catalytically assisted chemical reaction between two or more reaction species, and a catalytically assisted thermal dissociation of a single species.

3. The reformer of claim 1 wherein said reforming structure includes at least one axial manifold for introducing the reactant thereto and at least one manifold for allowing the reaction species to exit from the reforming structure.

4. The reformer of claim 1 wherein said reforming structure has an exposed peripheral surface for exchanging heat energy with an external environment.

5. The reformer of claim 1 wherein said reforming structure includes at least one axial reactant manifold for introducing the reactant thereto and peripheral exhaust means for exhausting the reaction species from a substantial portion of the periphery of the reforming structure.

6. The reformer of claim 1 further comprising
    a thermally conductive, gas-tight housing disposed about the stacked reforming structure to form a peripheral axial manifold, and
    means for allowing the reaction species to enter the peripheral axial manifold, wherein the reaction species is captured by the gas-tight housing.

7. The reformer of claim 1 further including a thermally conductive, gas-tight housing having means for exchanging heat energy with the external environment and said conductive plate by one of radiation, conduction and convection.

8. The reformer of claim 1 wherein an outer surface of the reforming structure contacts an inner surface of a gas-tight housing, said gas-tight housing being capable of conductively transferring heat energy to the conductive plates.

9. The reformer of claim 1 further comprising a gas-tight enclosure of cylindrical configuration for permitting pressurized reformer operation.

10. The reformer of claim 1 wherein the conductive plate includes means for providing a generally isothermal condition, in plane of the conductive plate.

11. The reformer of claim 1 wherein said reforming structure includes at least one axial reactant manifold for introducing the reactant thereto, and wherein the conductive plates includes extension means integrally formed thereon and extending into the axial reactant manifold for preheating an incoming reactant.

12. The reformer of claim 1 wherein at least one of the conductive plate and the catalyst plate includes an in-plane surface having passage means for allowing the reactant to flow over the surface of the plate.

13. The reformer of claim 1 further including
    an axial manifold formed within the reforming structure,
    passage means formed between the conductive plate and the catalyst plate, and
    means for generating a reactant flow pressure drop through the passage means between the conductive plate and the catalyst plate that is substantially greater than the reactant flow pressure drop within the axial manifold.

14. The reformer of claim 1 further including passage means formed between the catalyst and conductive plates for allowing an incoming reactant to pass over a surface of one of the plates, said passage means maintaining a substantially uniform pressure drop to provide for a substantially uniform flow of reactants along an axis of the reforming structure.

15. The reformer of claim 1 further including means for producing a substantially uniform temperature condition along an axis of the reforming structure.

16. The reformer of claim 1 wherein the catalyst plate is formed of a porous catalyst material, the porous material forming passage means for allowing an incoming reactant to pass through at least a portion of the plate.

17. The reformer of claim 1 wherein the thermally conductive plate is formed of a porous conductive material, the porous material forming passage means for allowing an incoming reactant to pass through the plate.

18. The reformer of claim 1 wherein the conductive plate is composed of at least one of a nonmetal such as silicon carbide, and a composite material.

19. The reformer of claim 1 wherein the conductive plate is composed of at least one metal such as aluminum, copper, iron, steel alloys, nickel, nickel alloys, chromium, chromium alloys, platinum, and platinum alloys.

20. The reformer of claim 1 wherein the catalyst plate is composed of a ceramic support plate having the catalyst material coating.

21. The reformer of claim 1 wherein the catalyst material is selected from the group consisting of platinum, palladium, nickel, nickel oxide, iron, iron oxide, chromium, chromium oxide, cobalt, cobalt oxide, copper, copper oxide, zinc, zinc oxide, molybdenum, molybdenum oxide, and other suitable transition metals and their oxides.

22. The reformer of claim 1 wherein the catalyst plate is composed of at least one of platinum, nickel, nickel oxide, chromium and chromium oxide.

23. The reformer of claim 1 wherein the reactant includes a hydrocarbon species, and at least one of $O_2$, $H_2O$ and $CO_2$.

24. The reformer of claim 1 wherein the reactant includes at least one of an alkane, a hydroxyl, a hydrocarbon bonded with a carboxyl, a hydrocarbon bonded with a carbonyl, an olifin hydrocarbon, a hydrocarbon bonded with an ether, a hydrocarbon bonded with an ester, a hydrocarbon bonded with an amine, a hydrocarbon bonded with an aromatic derivative, and a hydrocarbon bonded with another organo-derivative.

25. The reformer of claim 1 further including means for coupling the reaction species exiting the reformer to an external fuel cell.

26. The reformer of claim 23 wherein the hydrocarbon fuel and at least one of $H_2O$ and $CO_2$ undergo an endothermic catalytic reformation to produce $H_2$, $CO$, $H_2O$ and $CO_2$, the energy requirements for the endothermic reforming being supplied by energy produced by an external fuel cell, said energy being transferred from the fuel cell by the conducting plate through in-plane thermal conduction.

27. The reformer of claim 23 wherein the hydrocarbon fuel and $O_2$ undergo catalytic combustion and reformation to produce $H_2$, CO, $H_2O$ and $CO_2$, and at least one of an exothermic combustion and an exothermic reaction of an external fuel cell supplementing the energy requirements for the endothermic reforming through the in-plane thermal conduction of the conducting plate.

28. The reformer of claim 23 or 24 wherein the CO and $H_2O$ undergo catalytic shift reaction to form $CO_2$ and $H_2$.

29. The reformer of claim 1 wherein the reforming structure has a substantially cylindrical shape.

30. The reformer of claim 1 wherein the reforming structure is cylindrical and at least one of the catalyst plate and the conductive plate has a diameter between about 1 inch and about 20 inches, and has a thickness between about 0.002 inch and about 0.2 inch.

31. The reformer of claim 1 wherein the reforming structure has a substantially rectangular shape.

32. The reformer of claim 1, wherein said reforming structure extends, in one orientation, along a vertical axis, and wherein said reforming structure includes at least one vertically-extending axial manifold for introducing the reactant thereto and at least one manifold for allowing the reaction species to exit from the reforming structure.

33. The reformer of claim 1, wherein said reforming structure comprises peripheral exhaust means for exhausting the reaction species from a peripheral portion of the reforming structure, and a thermally conductive, gas-tight housing disposed about the stacked reforming structure to capture the reaction species exhausted by said reforming structure through said peripheral portion.

34. The reformer of claim 33, further comprising means for allowing the reaction species to enter the gas-tight housing, wherein the reaction species is captured by the gas-tight housing.

35. A plate-type reformer for reforming a reactant into reaction species during operation, said reformer comprising:

a plurality of plates composed of a thermally conductive material interspersed throughout the thickness of the plate with one or more catalyst materials for promoting the reforming process, said plates being stacked together to form a reforming structure, the plates conductively transferring heat energy in-plane, across a surface of the plates, to support the reforming process.

36. The reformer of claim 35 wherein said reforming structure includes at least one axial manifold for introducing the reactant thereto and at least one manifold for allowing the reaction species to exit from the reforming structure.

37. The reformer of claim 35 wherein said reforming structure has an exposed peripheral surface for exchanging heat energy with an external environment.

38. The reformer of claim 35 wherein said reforming structure includes at least one axial reactant manifold for introducing the reactant thereto and peripheral exhaust means for exhausting the reaction species from a peripheral portion of the reforming structure.

39. The reformer of claim 35 further comprising a thermally conductive, gas-tight housing disposed about the reforming structure to form a peripheral axial manifold, and means for allowing the reaction species to enter the peripheral axial manifold, wherein the reaction species is captured by the gas-tight housing.

40. The reformer of claim 35 further including a thermally conductive, gas-tight housing having means for exchanging heat energy with the external environment and said reforming structure by one of radiation, conduction and convection.

41. The reformer of claim 35 wherein an outer surface of the reforming structure contacts an inner surface of a gas-tight housing, said gas-tight housing being capable of conductively transferring heat energy to the reforming structure.

42. The reformer of claim 35 further comprising a gas-tight enclosure of cylindrical configuration for permitting pressurized reformer operation.

43. The reformer of claim 35 wherein the reforming structure includes means for providing a generally isothermal condition through said reforming structure.

44. The reformer of claim 35 wherein said reforming structure includes at least one axial reactant manifold for introducing a reactant thereto, and wherein the reforming structure includes extension means integrally formed therewith and extending into the axial reactant manifold for preheating the reactant.

45. The reformer of claim 35 wherein said reforming structure includes passage means for allowing a reactant to flow through the structure.

46. The reformer of claim 35 further including an axial manifold formed within the reforming structure, reactant passage means for allowing a reactant to flow in-plane of the reforming structure, and means for generating a reactant flow pressure drop through the passage means that is substantially greater than the reactant flow pressure drop within the axial manifold.

47. The reformer of claim 46 wherein the passage means maintains a substantially uniform pressure drop to provide for a substantially uniform flow of reactants along an axis of the reforming structure.

48. The reformer of claim 35 further including means for producing a substantially uniform temperature condition along an axis of the reforming structure.

49. The reformer of claim 35 wherein the conductive material is composed of at least one of a nonmetal such as silicon carbide, and a composite material.

50. The reformer of claim 35 wherein the conductive material is composed of at least one metal such as aluminum, copper, iron, steel alloys, nickel, nickel alloys, chromium, chromium alloys, platinum, and platinum alloys.

51. The reformer of claim 35 wherein the catalyst material is selected from the group consisting of platinum, palladium, nickel, nickel oxide, iron, iron oxide, chromium, chromium oxide, cobalt, cobalt oxide, copper, copper oxide, zinc, zinc oxide, molybdenum, molybdenum oxide, other transition metals and their oxides.

52. The reformer of claim 35 wherein the reactant includes a hydrocarbon species, and at least one of $O_2$, $H_2O$ and $CO_2$.

53. The reformer of claim 35 further including means for coupling the reaction species exiting the reformer to an external fuel cell.

54. The reformer of claim 35 wherein the reactant includes a hydrocarbon fuel and at least one of $H_2O$ and $CO_2$ which undergo catalytic reformation to produce $H_2$, CO, $H_2O$ and $CO_2$, and wherein an exothermic reaction of an external fuel cell supplements the energy requirements for the endothermic reforming reaction of the reforming structure through the thermally conductive material.

55. The reformer of claim 35 wherein the reactant includes a hydrocarbon fuel and $O_2$ which undergo catalytic combustion and reformation to produce $H_2$, CO, $H_2O$ and $CO_2$, and at least one of an exothermic combustion and an exothermic reaction of an external fuel cell supplements the energy requirements for the endothermic reforming reaction of the reforming structure through the thermally conductive material.

56. The reformer of claim 35 wherein the reforming structure has a substantially cylindrical shape.

57. The reformer of claim 35 wherein the reforming structure is cylindrical and has a diameter between about 1 inch and about 20 inches.

58. The reformer of claim 35 wherein the reforming structure has a substantially rectangular shape.

59. The reformer of claim 35, wherein said conductive plates only conduct heat in the in-plane direction from one end region of the surface to another.

60. The reformer of claim 1 wherein said catalyst plate comprises a plurality of zones spaced along a surface of the plate for effecting selected reactions, said zones including a combustion zone, a reforming zone, and an electrochemical zone.

61. The reformer of claim 35, wherein said conductive plate forms a near isothermal temperature condition in-pane of said catalyst and said conductive plates.

* * * * *

UNITED STATES PATENT AND TRADEMARK OFFICE
CERTIFICATE OF CORRECTION

PATENT NO. : 5,858,314
DATED : January 12, 1999
INVENTOR(S) : Hsu et al.

Page 1 of 1

It is certified that error appears in the above-identified patent and that said Letters Patent is hereby corrected as shown below:

Column 16, claim 47,
Line 1, delete: "... of claim 46 wherein ..." and insert: "... of claim 45 wherein ...";

Signed and Sealed this

Twelfth Day of June, 2001

*Attest:*

*Attesting Officer*

NICHOLAS P. GODICI
*Acting Director of the United States Patent and Trademark Office*